United States Patent

[11] 3,596,533

[72] Inventor George C. Nightingale
   Valparaiso, Ind.
[21] Appl. No. 857,284
[22] Filed Aug. 27, 1969
[45] Patented Aug. 3, 1971
[73] Assignee McGill Manufacturing Company, Inc.
   Valparaiso, Ind.
   Continuation-in-part of application Ser. No. 675,743, Oct. 16, 1967, now abandoned.

[54] LUBRICATING WASHERS FOR REDUCING FRICTION BETWEEN MOVING PARTS IN A CAM FOLLOWER
7 Claims, 5 Drawing Figs.
[52] U.S. Cl.................................................. 74/569,
   308/35, 308/187.1
[51] Int. Cl.................................................. F16h 53/08
[50] Field of Search.......................................... 74/569;
   308/35, 187.1, 187

[56] References Cited
UNITED STATES PATENTS

| 2,770,508 | 11/1956 | Smith | 74/569 X |
| 3,107,949 | 10/1963 | Moskovitz | 308/187.1 X |
| 3,138,942 | 6/1964 | Kayser | 308/187.1 X |
| 3,266,856 | 8/1966 | Steinert et al. | 308/187.1 |

Primary Examiner—Milton Kaufman
Assistant Examiner—F. D. Shoemaker
Attorney—Mueller and Aichele ABSTRACT: An annular nylon washer is inserted between mutual surfaces formed by the integral end flange of the stud of a cam follower-type bearing and the face of a counter bore in the axial end of the outer racering in which it is fitted. A similar washer is inserted between the mutual surfaces formed by the annular end plate and the face of the counterbore in which it is mounted. The ring is self-lubricating and acts to reduce the sliding friction between these surfaces to prolong the life of the bearing.

PATENTED AUG 3 1971
3,596,533
SHEET 1 OF 2
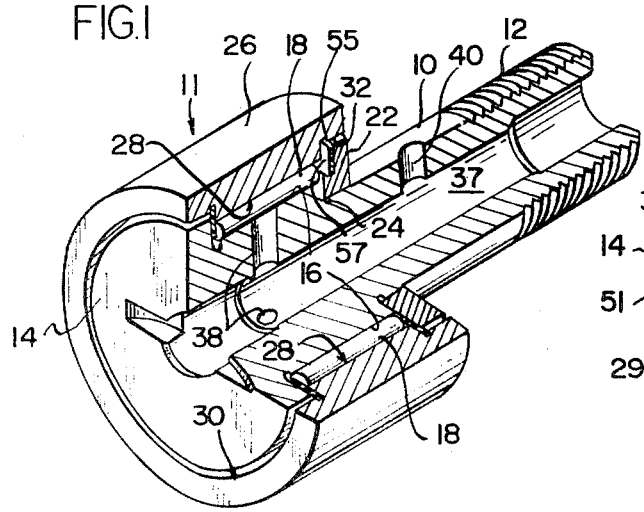
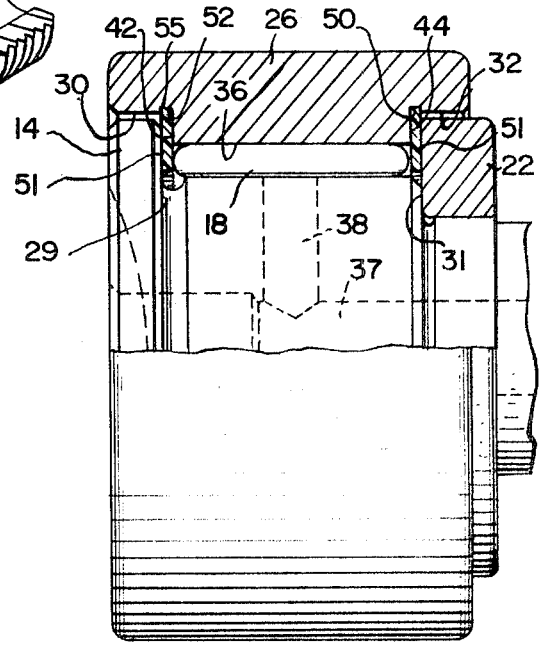
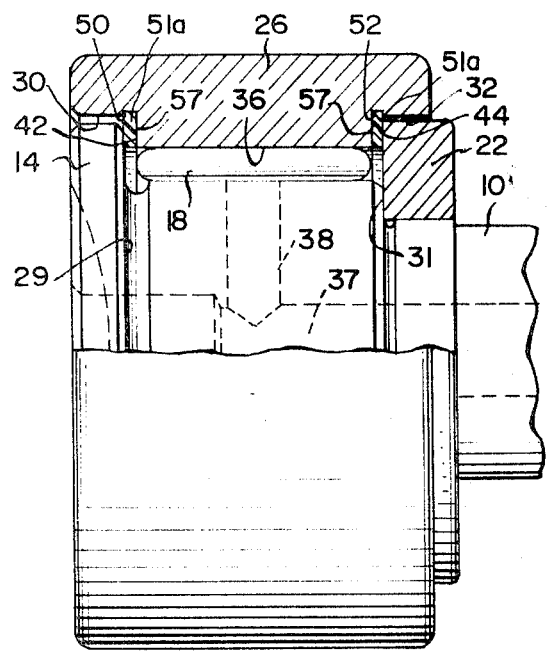
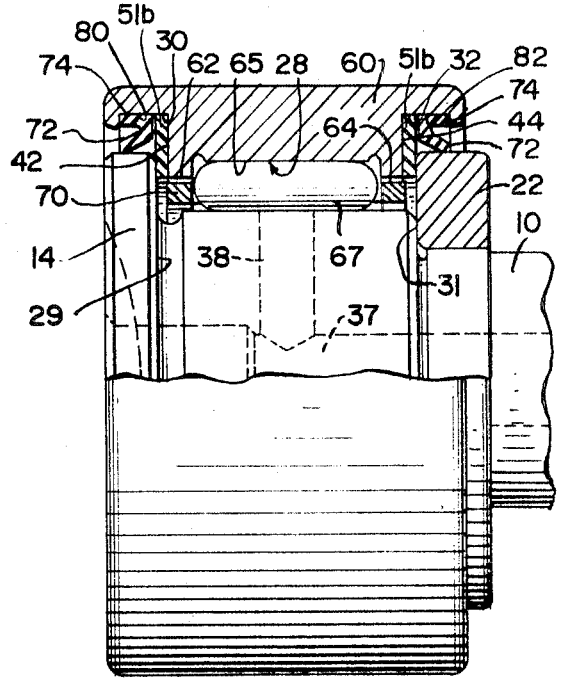
INVENTOR
GEORGE C. NIGHTINGALE
BY Mueller, Aichele & Rauner
ATTORNEYS

LUBRICATING WASHERS FOR REDUCING FRICTION BETWEEN MOVING PARTS IN A CAM FOLLOWER

This application is a continuation-in-part of my application Ser. No. 675,473, filed Oct. 16, 1967, now abandoned and assigned to the assignee of this application.

BACKGROUND OF THE INVENTION

A problem has long existed in cam follow-type bearings in that the annular lubricant holding space between the inner and outer racerings is so small only a small amount of lubricant can be contained therein so that slight contamination of the lubricant in the space can bring a premature end to the lift of the cam follower. Generally, the stud and integral end flange thereof are manufactured in a manner that leaves small turn marks on the surfaces. During operation, the flange of the bearing is moved against the face of the counterbore in the outer racering in which it is mounted due to casual excursions axially of the outer recording during bearing operation. The force of this contact between these members is of a small magnitude since cam follower bearings are generally not equipped to carry thrust loads and are not considered for such applications. Yet this slight contact generates sufficient sliding friction between the thrust surfaces to cause the turn marks to be worn off the flange resulting in minute particles of metal falling into the lubricant holding space. These particles contaminate the lubricant to such an extent that the bearing fails.

SUMMARY OF THE INVENTION

It is an object of this invention to reduce the possibility of lubricant contamination from wear of internal parts of a cam follower-type bearing due to sliding friction between the parts thereby extending the life of the bearing.

In one embodiment of this invention, a stud is positioned in the bore of the outer racering of a cam follower-type bearing to form the inner racering. A flanged portion integral with the stud is positioned in a counterbore in one axial end of the outer racering. The face of the counterbore and the stud flange provide first mutual contact surfaces. An annular end plate is pressed onto the stud and fitted into a second counterbore in the opposite axial end portion of the outer racering. The face of this counterbore and the annular end plate provide second mutual contact surfaces. The first and second mutual contact surfaces cooperate to restrict the casual axial excursions of the inner racering or stud with respect to the outer racering. An antifriction device in the form of a nylon annular ring or washer is fitted into each of the axial ends of the outer racering. When in this position, the radial body portion of the annular ring is located between the first and second mutual contact surfaces thereby greatly reducing the sliding friction therebetween resulting from the excursion of the stud in an operating installation. This reduced friction results in reduced wear of the surfaces thereby reducing the contamination of the lubricant and prolonging the life of the bearing. The radial body portion of the annular ring can extend radially, inwardly past the face of each of the counterbores into the raceway of the bearing opposite the ends of the rolling elements and between the flange portion and the annular end plate so as to reduce sliding friction between the rollers and the flange and end plate when the rollers are casually moved in an axial direction during operation.

The annular ring may also be used with a sealing member having first and second sealing portions. With the radial body portion of the antifriction device in the grooves in the outer racering, one of the sealing portions rides in an interference fit on the periphery of the integral flange portion of the stud or the periphery of the annular end plate and acts to bias the second sealing portion into a close running fit with the bottom of the respective grooves. The sealing members act to greatly reduce the introduction of impurities from the exterior of the cam follower into the lubricant holding space to reduce contamination of the lubricant and increase bearing life.

In the drawings:

FIG. 1 is a perspective view partly in cross section of a cam follower-type bearing in accordance with this invention;

FIG. 2 is a side elevation view partly in cross section of the device of FIG. 1 in accordance with this invention;

FIG. 3 is a side elevation view partly in cross section illustrating another embodiment of the device of FIG. 1 in accordance with this invention;

FIG. 4 is a side elevation view partly in cross section of a further embodiment of the device of FIG. 1 in accordance with this invention.

DETAILED DESCRIPTION

Figure 5:
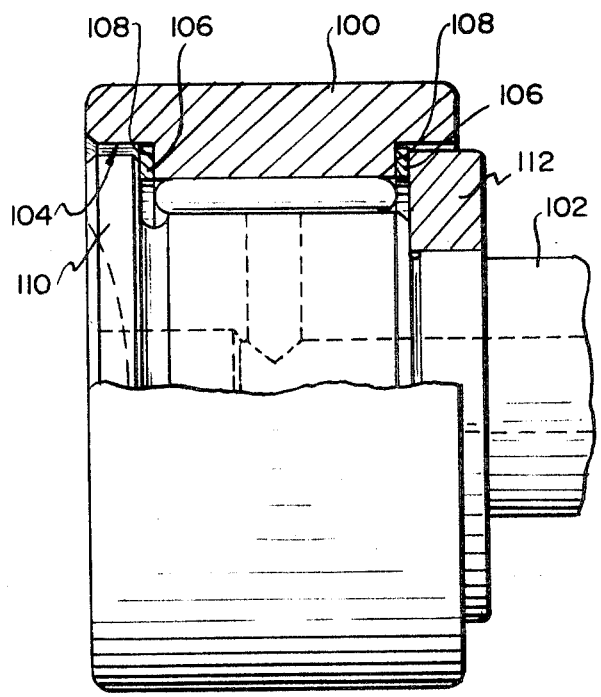
FIG. 5 is a side elevation view partly in cross section of still another embodiment of the device of FIG. 1 in accordance with this invention.

Referring to the figures of the drawings, FIG. 1 shows a roller bearing cam follower 11 with a threaded portion 12 at one end of the stud 10 so that the entire bearing may be secured to a suitable arm for transmitting motion. Stud 10 has an integral flange portion 14 at one end thereof, and adjacent this flange there is a bearing surface 16 having a reduced diameter from the outer diameter of flange portion 14, which acts as the inner racering of the bearing. A plurality of rollers 18 are disposed about the stud member 10 on the bearing surface 16, and the rollers are guided in position by the end flange 14 and an annular end plate or retainer plate 22. The end plate 22 bore has a press fit with the stud surface and has substantially the same outer diameter as the flange 14. An outer racering 26 has a bore 28 and counterbores 30 and 32 in each axial end thereof. The inner race 36 of the outer racering 26 is positioned between the counterbores 30 and 32 and bears upon the roller 18.

Lubrication for the rollers 18 is provided through the axial lubricant duct 37 which extends through the center of the stud member 10 and which is in communication with the outer diameter of the inner race bearing surface 16 by means of radial apertures 38. A suitable lubricant may be introduced into either end of the lubricant duct through the radial aperture 40. Preferably, it is desirable to plug both ends of the duct as well as aperture 40 and introduce the lubricant through the most convenient aperture after which it may be replugged to prevent loss of lubricant. The raceway defined by the inner diameter of the outer racering 26 and the outer diameter of the inner racering or stud 10 forms the annular lubricant holding space, and as can be seen in FIG. 1 with the rollers in position in the bearing there is an extremely small space for the lubricant to occupy.

In one axial end of the bearing, the inner face 29 (FIG. 2) of the flange portion 14, when positioned or fitted into the counterbore 30 with the stud 10 extending through the bore 28 of the outer racering 26, and the face 42 of the counterbore 30 provide mutual contact surfaces. In the opposite axial end of the bearing, the face 31 (FIG. 2) of the annular end plate 22 and the face 44 of the counterbore 32 provide second mutual contact surfaces. The casual excursions axially of the stud with respect to the outer racering in an operating installation are limited by these mutual contact surfaces. In the past, sliding friction between the mutual contact surfaces has caused minute particles of metal to fall into the annular lubricant holding space between the racerings causing contamination of the lubricant and failure of the bearing.

This invention provides a unique means for reducing this sliding friction thereby preserving the life of the bearing. In accordance with the invention, first and second annular grooves 50 and 52 are positioned adjacent the opposite axial ends of the outer racering 26. One wall of each of the grooves 50 and 52 contain the face (42 and 44 respectively) of the counterbore associated with that particular groove. The other wall of each groove is spaced towards the outboard axial end of the outer racering. An annular ring or washer 51 having a bore and an outer peripheral edge 55 which define a radial body portion 57 (FIG. 1) is inserted into each of the grooves. The outer diameter of the peripheral edge 55 of annular ring or washer 51 is substantially equal to the diameter to the bottom of each of the grooves 50 and 52 so that the ring 51 rides in a close running fit with the grooves. The ring 51 is substantially flat, has a relatively thin cross section and is made of synthetic material such as nylon, for instance, that is self-lubricating. As shown in FIG. 2, with the ring inserted in groove 52, the radial body portion of the ring is positioned between the mutual contact surfaces formed by the face 29 of flange portion 14 and the face 42 of the counterbore 30. The ring 51 inserted in groove 50 has its radial body portion positioned between the face 31 of the annular end plate 22 and the face 44 of the counterbore 32. The radial body portion 57 of each ring 51 extends downwardly in a radial direction into the raceway of the bearing and on opposite sides of the rolling elements 18 between the extremities of the rolling elements and annular flange portion 14 and annular end plate 22 for all positions of the rolling elements.

Because the ring 51 (FIG. 2) extends into the raceway of the bearing 11 and is positioned at the extremities of the roller 18, any casual movement axially of the rollers relative to the outer racering of the cam follower will compress the ring 51 against either the flange 14 of the stud 10 or the end plate 22 to reduce the sliding friction between the rollers and the mutual contact surfaces.

In operation, if the face 42 of counterbore 30 attempts to move into contact with the flange portion 14 of the stud 10, or face 44 of the counterbore 32 into contact with annular end plate 22, it can be seen that the ring 51 being positioned between the mutual contact surfaces prevents metal-to-metal contact. Because of the self-lubricating feature of the material, the sliding friction between the mutual contact surfaces of the bearing will be greatly reduced. Reduction of the sliding friction between the mutual contact surfaces of the bearing has provided surprising results in that bearing life has been extended substantially beyond the life of cam follower-type bearings without this feature. Essentially, the reason for this extended life is that with the reduction of the sliding friction between the mutual contact surfaces, there is little wear of the surfaces with a resulting decrease in the particles which can fall into the raceway to contaminate the lubricant.

It has been found that the principal source for contamination has been the turn marks on the stud flange 14 which are worn off by the sliding friction caused by the contact of the counterbore face 42 with the flange portion 14. For this reason, in many instances it is only necessary to have the annular ring 51a as shown in FIG. 3 positioned between the flange and the counterbore face rather than extending it down into the raceway.

Referring to FIG. 4, a further embodiment of the invention is shown. Once again like elements will be given the same numbers as used for FIGS. 1 and 2. In this embodiment, an outer racering 60 is used which has land portions 62 and 64 formed integrally therewith. The land portions 62 and 64 define a channel 65 forming an outer raceway for the rollers 67. The land portions 62 and 64 restrict the axial movement of the rollers. A retainer or cage 70 is positioned in the bore of the outer racering 60 in riding engagement with the lands. The retainer 70 increases the lubricant storage capacity of the annular lubricant holding space between the bearing rings by separating the rollers from one another.

In addition to the lubricant being contaminated from within the bearing structure itself, it is possible for contaminants to enter the bearing raceway because of the clearances between the flange 14 and the annular end plate 22, and the outer racering 60. In this embodiment the annular ring 51b cooperates with a sealing member having first and second sealing portions or lips 72 and 74. The member can be made from the same material as the ring 51b and in some instances may be integrally molded therewith.

In operation, with the annular rings 51b in position in the grooves 80 and 82 respectively, the first sealing portion 72 of the sealing member extends in an interference fit to the periphery of the flange 14 of stud 10 and to the periphery of annular end plate 22. The contact of this sealing portion with the peripheries of the flange and end plate bias the second sealing portion 74 into the base of the grooves in a tight running fit with the racering 60. It can be seen that any contaminants external of the bearing which attempt to enter into the space between the racering and the flange 14 and annular end plate 22 will act to force either sealing portions 72 or sealing portions 74 tighter against the respective surfaces against which they lie, holding them more firmly in place thereby prohibiting contaminates entering into the bearing raceway. This structure, therefore, reduces internal contamination of the lubricant through use of the annular rings 51b and external contamination of the same through the sealing portions 72 and 74.

The foregoing embodiments have taught the use of first and second annular grooves such as 50 and 52 (FIG. 2) positioned adjacent the opposite axial ends of the outer racering 26. These grooves are used to facilitate assembling the annular ring 51 into the cam follower. However, it is not absolutely necessary to have these grooves in the outer racering and it is contemplated to be within the scope of this invention to assemble the annular rings into the cam follower without the use of such grooves. Such an embodiment is shown in FIG. 5, where the cam follower comprises an outer racering 100 which has a stud 102 extending through the bore 104 thereof. Annular rings 106 made of a self-lubricating material similar to rings 51 are set into opposite axial ends of the outer racering 100 against the faces 108 of the counterbores of the outer racering. As in the embodiment shown in FIG. 3, the radial body portion of each of the rings is positioned only between the face of the flange 110 of the stud 102 and the counterbore face, and the face of the annular end plate 112 and the face of the counterbore at the opposite axial end of the outer racering and does not extend into the raceway.

The ring operates in a manner heretofore described with the other embodiments to prevent friction between the mutual contact surfaces of the outer racering and the stud flange and annular end plate thereby virtually eliminating failure of the cam follower through internal contamination.

The following dimensions, which are not meant to limit the invention in any way but are for illustrative purposes only, where used in constructing a cam follower-type bearing in accordance with the embodiment shown in FIG. 4.

Bore 28     0.769 inch
Counterbores 30 and 32     0.858 inch
Grooves 80 and 82
  bore diameter     0.909 inch
Grooves 80 and 82
  axial width     0.085 inch
Stud 10 outer diameter     0.583 inch
Flange 14 diameter     0.781 inch
Land 62 and 64 diameter     0.703 inch
Ring 51b thickness     0.020 inch
Ring 51b outer diameter     0.902 inch
Ring 51b bore     0.709 inch What has been described, therefore, is an improved cam follower bearing wherein the bearing life is extended by greatly reducing the sliding friction between the mutual contact surfaces of the bearing and by sealing the bearing ends against the entrance of contaminants from outside the bearing.

I claim:

1. In a cam follower-type bearing including an outer racering having a bore and an inner racering positioned in the bore of the outer racering and having a flange at each outboard axial end positioned in a counterbore of the outer racering so that each of the flange faces and the counterbore faces provide mutual contact surfaces to limit casual excursions of the outer racering relative to the inner racering in an operating installation, the combination including, an annular ring of a self-lubricating material having a bore and a peripheral edge defining a radial body portion thereof, one of said rings positioned in each of the counterbores of the outer racering with said body portion extending between the flange face and the counterbore face, said ring preventing direct engagement of the mutual contact surfaces, and the self-lubricating properties of said ring reducing sliding friction between the mutual contact faces thereby extending the life of the bearing.

2. The cam follower-type bearing of claim 1 further including an annular groove in each axial end of the outer racering, one wall of said groove containing the face of the counterbore and the other wall being axially spaced outboard thereof, each of said annular rings being positioned and supported in a respective groove.

3. The cam follower-type bearing of claim 2 further including sealing means positioned in each said groove in the outer racering for sealing each axial end of the bearing against introduction of foreign matter therein.

4. In a cam follower-type bearing comprising a rotatable member having a bore and respective counterbores at the outboard axial ends thereof defining an outer racering, a stud positioned in the bore forming an inner racering, and a plurality of rolling elements positioned in the raceway defined by the inner and outer racerings, the stud having a flange portion at one end fitting into one of the counterbores so that the flange and the face of the counterbore provide first mutual contact surfaces, and an annular end plate mounted on the inner racering and being fitted into the other counterbore so that the annular end plate and the face of the other counterbore form second mutual contact surfaces, whereby the first and second mutual contact surfaces limit the casual axial excursions of the two racerings relative to one another, the combination including, first and second annular grooves in the outer racering defined by the walls for the full depth thereof, one wall of each said grooves containing the face of the counterbore and the other wall being axially spaced outboard thereof, first and second annular members made of a synthetic self-lubricating material each having a bore and an outer peripheral edge defining a radial body portion, said annular members being positioned and supported in the first and second grooves with the stud passing through the bore thereof, and with said annular members being positioned in said grooves said radial body portions thereof being located between the mutual contact surfaces for all positions thereof, said annular members reducing the sliding friction between said mutual contact surfaces thereby substantially increasing the life of the bearing.

5. The cam follower-type bearing of claim 4 wherein the diameter of the outer peripheral edge of each annular member is substantially equal to the diameter to the bottom of each of said grooves so that said members ride in a close running fit within said grooves, and said radial body portions of each said member extend radially inwardly into the bearing raceway on opposite sides of the rolling elements and are respectively positioned between the extremities of the rolling elements and the flanged portion and annular end plate for all positions of the rolling elements, thereby reducing sliding friction therebetween the axial excursions of the rolling elements.

6. The cam follower-type bearing of claim 4 further including sealing means positioned in said grooves in the outer racering and against the flange portion of the stud and the annular end plate respectively for sealing the axial ends of the bearing against introduction of foreign matter therein.

7. In the cam follower-type bearing of claim 1 the combination further including the inner racering being in the form of a stud, and wherein the flange at one outboard axial end is an integral portion of said stud, and said flange at the opposite outboard axial end is an annular end plate.